US010261568B2

(12) United States Patent
Jensen et al.

(10) Patent No.: US 10,261,568 B2
(45) Date of Patent: Apr. 16, 2019

(54) ENHANCING USER EXPERIENCE RELATIVE TO PERIPHERAL DEVICES

(71) Applicant: Microsoft Technology Licensing, LLC, Redmond, WA (US)

(72) Inventors: Michael Jensen, Redmond, WA (US); Peter Jasinski, Redmond, WA (US); Vineet Thuvara, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 14/856,508

(22) Filed: Sep. 16, 2015

(65) Prior Publication Data

US 2017/0075405 A1    Mar. 16, 2017

(51) Int. Cl.
*G06F 1/32* (2006.01)
*G06F 1/3234* (2019.01)
*G06F 1/3296* (2019.01)
*G06F 1/3206* (2019.01)

(52) U.S. Cl.
CPC ............ *G06F 1/325* (2013.01); *G06F 1/3206* (2013.01); *G06F 1/3259* (2013.01); *G06F 1/3296* (2013.01); *Y02D 10/155* (2018.01)

(58) Field of Classification Search
CPC .... G06F 1/1613; G06F 1/3203; G06F 1/3262; G06F 3/03545
See application file for complete search history.

(56) References Cited

U.S. PATENT DOCUMENTS

| 6,772,331 | B1 | 8/2004 | Hind et al. | |
|---|---|---|---|---|
| 7,848,703 | B1 * | 12/2010 | Beard | H04W 76/023 340/573.1 |
| 8,626,144 | B2 | 1/2014 | Talty et al. | |
| 8,750,796 | B2 | 6/2014 | Claus et al. | |
| 8,850,045 | B2 | 9/2014 | Berg et al. | |
| 2002/0178388 | A1 * | 11/2002 | Huppi | G06F 1/1684 713/300 |
| 2005/0166076 | A1 | 7/2005 | Truong | |
| 2006/0104021 | A1 | 5/2006 | Chen et al. | |
| 2007/0123166 | A1 | 5/2007 | Sheynman et al. | |
| 2007/0129013 | A1 | 6/2007 | Mehta et al. | |
| 2007/0197164 | A1 | 8/2007 | Sheynman et al. | |

(Continued)

FOREIGN PATENT DOCUMENTS

| EP | 2355563 A1 | 8/2011 |
|---|---|---|
| WO | 2008/027834 A1 | 3/2008 |

(Continued)

OTHER PUBLICATIONS

Response filed Jan. 20, 2017 to the International Search Report and Written Opinion dated Sep. 26, 2016 from PCT Patent Application No. PCT/US2016/045669, 14 pages.

(Continued)

*Primary Examiner* — Nabil H Syed
(74) *Attorney, Agent, or Firm* — Rainier Patents, P.S.

(57) ABSTRACT

The description relates to enhancing user experience with devices, such as host and peripheral devices. One example relates to devices that can automatically power down when packaged for shipping and power up when opened by the user. Another example allows automatic, secure pairing between sets of host and peripheral devices without any affirmative user actions.

20 Claims, 9 Drawing Sheets

(56) References Cited

U.S. PATENT DOCUMENTS

| | | | |
|---|---|---|---|
| 2007/0300063 A1 | 12/2007 | Adams et al. | |
| 2009/0319673 A1 | 12/2009 | Peters | |
| 2010/0317289 A1 | 12/2010 | Desai et al. | |
| 2011/0299241 A1 | 12/2011 | Chen | |
| 2011/0314153 A1 | 12/2011 | Bathiche et al. | |
| 2012/0243174 A1 | 9/2012 | Lee et al. | |
| 2012/0267269 A1 | 10/2012 | Tang | |
| 2012/0322376 A1 | 12/2012 | Couse | |
| 2013/0017816 A1 | 1/2013 | Talty et al. | |
| 2013/0059596 A1 | 1/2013 | Preston et al. | |
| 2013/0080811 A1* | 3/2013 | Low | G06F 3/033 713/323 |
| 2013/0130749 A1* | 5/2013 | Andersen | H04M 1/6066 455/569.1 |
| 2013/0235521 A1 | 9/2013 | Burch et al. | |
| 2014/0306909 A1* | 10/2014 | Pedersen | G06F 3/03545 345/173 |
| 2014/0378056 A1 | 12/2014 | Liu | |
| 2015/0050879 A1 | 2/2015 | MacDuff et al. | |
| 2015/0111621 A1 | 4/2015 | Smith | |
| 2015/0188891 A1 | 7/2015 | Grange et al. | |
| 2016/0027399 A1* | 1/2016 | Wilde | G06F 13/382 345/520 |
| 2016/0306949 A1 | 10/2016 | Tallapaneni | |
| 2017/0078300 A1 | 3/2017 | He et al. | |

FOREIGN PATENT DOCUMENTS

| | | |
|---|---|---|
| WO | 2013/134438 A1 | 9/2013 |
| WO | 2013181778 A1 | 12/2013 |
| WO | 2014/045102 A1 | 3/2014 |

OTHER PUBLICATIONS

Aftab et al., "Secure SMS based Automatic Device Pairing Approach for Mobile Phones", Proceedings of the 9th International Conference on Intelligent Computing Theories and Technology, Jul. 28, 2013, 10 pages.

Response filed Jun. 16, 2017 to the Non-Final Office Action dated Mar. 17, 2017 from U.S. Appl. No. 14/856,451, 12 pages.

Notice of Allowance dated Jul. 5, 2017 from U.S. Appl. No. 14/856,451, 20 pages.

International Preliminary Report on Patentability dated Jun. 23, 2017 from PCT Patent Application No. PCT/US2016/045669, 6 pages.

International Search Report and Written Opinion dated Sep. 26, 2016 from PCT Patent Application No. PCT/US2016/045669, 10 pages.

Non-Final Office Action dated Mar. 17, 2017 from U.S. Appl. No. 14/856,451, 32 pages.

International Search Report and Written Opinion dated Feb. 15, 2017 from PCT Patent Application No. PCT/US2016/045949, 25 pages.

Supplemental Notice of Allowability dated Aug. 7, 2017 from U.S. Appl. No. 14/856,451, 6 pages.

Demand filed May 4, 2017 with Response to the International Search Report and Written Opinion dated Feb. 15, 2017 from PCT Patent Application No. PCT/US2016/045949, 17 pages.

"Second Written Opinion Issued in PCT Application No. PCT/US2016/045949", dated Aug. 4, 2017, 4 Pages.

"Second Written Opinion Issued in PCT Application No. PCT/US2016/045949", dated Jan. 9, 2018, 5 Pages.

"International Preliminary Report on Patentability Issued in PCT Application No. PCT/US2016/045949", dated Mar. 15, 2018, 13 Pages.

* cited by examiner

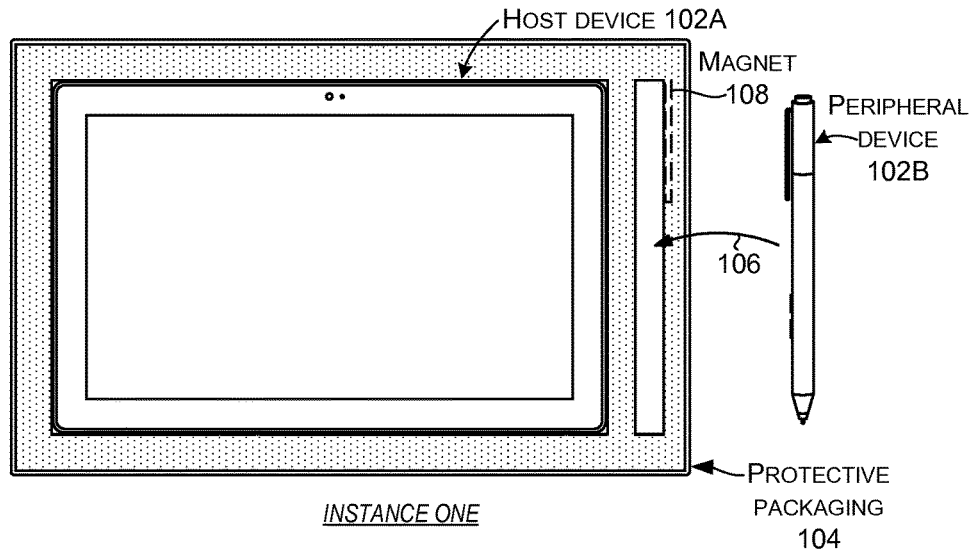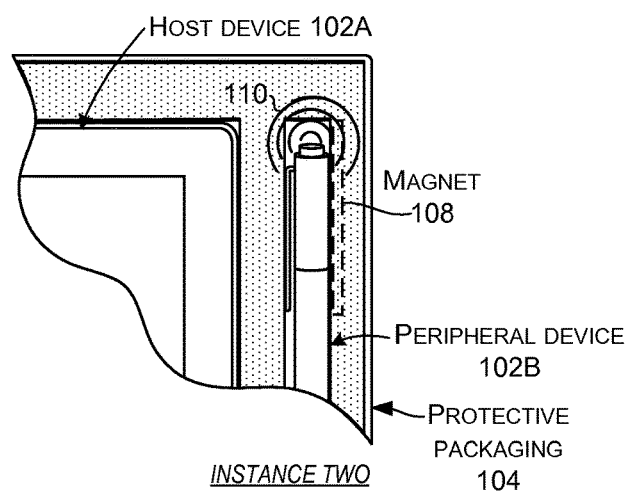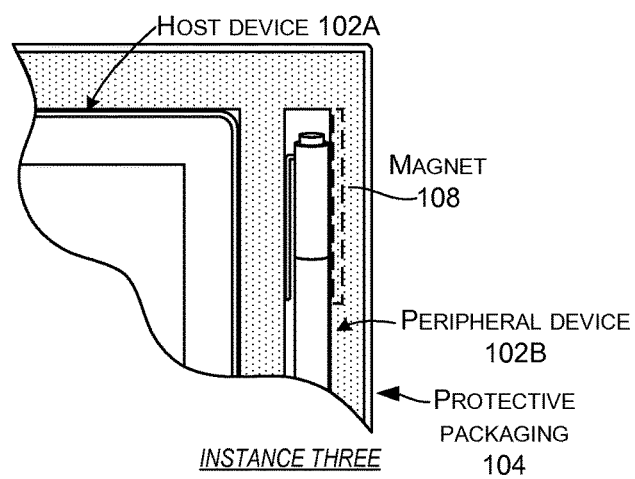
FIG. 1

ENHANCING USER EXPERIENCE RELATIVE TO PERIPHERAL DEVICES

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1-2 and 4-6 collectively show example use case scenarios in accordance with some implementations of the present concepts.

DESCRIPTION

The present concepts relate to enhancing user experiences relative to devices, such as host devices and/or peripheral devices. Traditionally, when a user or consumer buys a peripheral wireless device (e.g., peripheral device), such as packaged with a host wireless device (e.g., host device), the user has to figure out how to manually power up the peripheral device and how to manually wirelessly pair the peripheral device and the host device so that they work as expected. Since consumers tend to do this infrequently, they tend to be unfamiliar with the process. Unfamiliarity tends to cause errors. For instance, the user may put the battery in backwards so the device does not power up, or the user may not initiate pairing at the proper time. As such, the user may be frustrated with the product. The present implementations can automate these processes to create a seamless successful user experience where the devices automatically work as intended.

Figure 2:
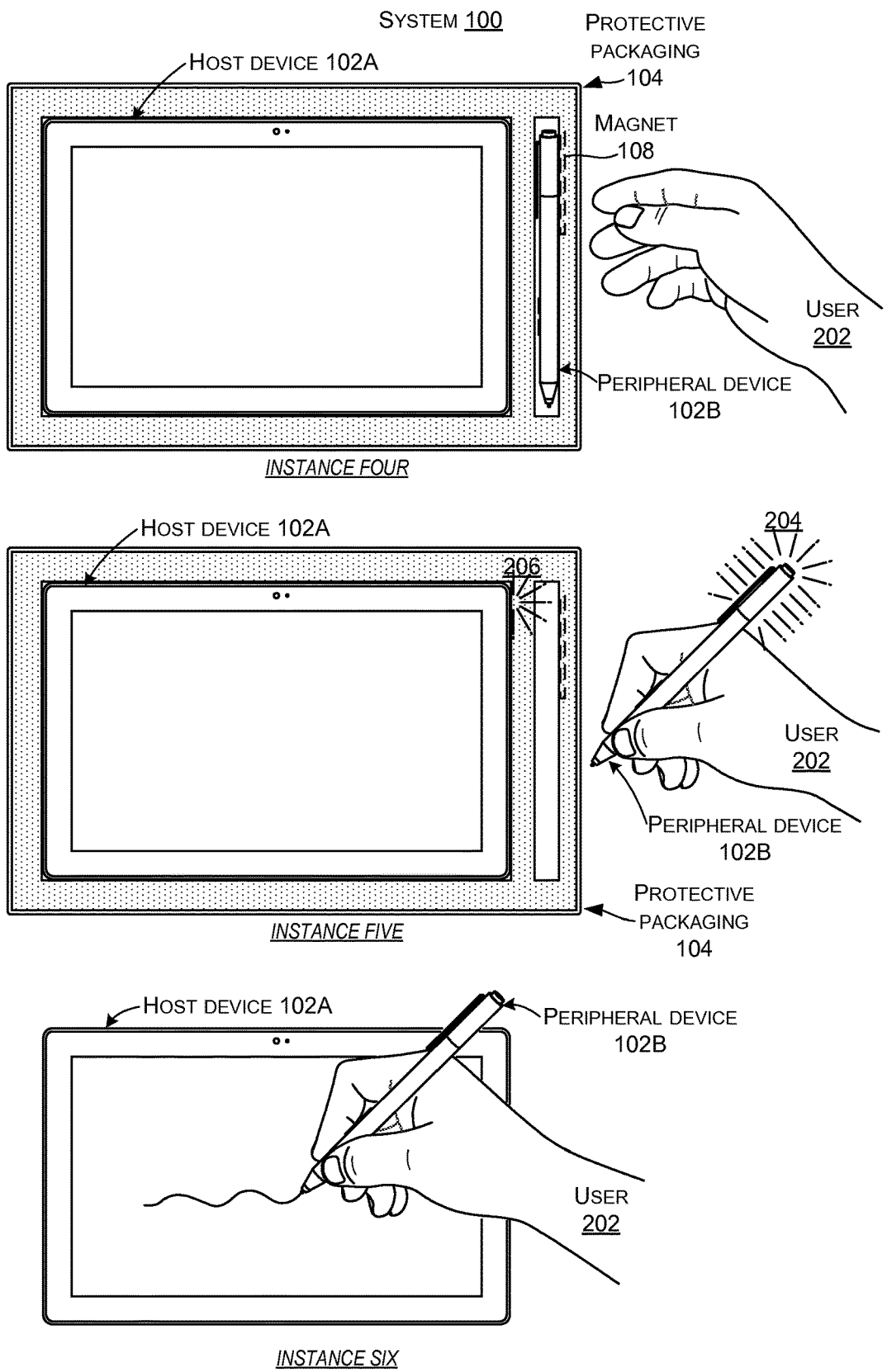

FIGS. 1-2 collectively illustrate an automatic power state management use case scenario explained relative to a system 100 that includes devices 102. The automatic power state management concepts can be applied to one or more devices 102 of the system. In this example, the system includes a host device 102A and a peripheral device 102B. In this case, host device 102A is manifest as a tablet type device and peripheral device 102B is manifest as an electronic stylus (hereinafter, "stylus"). Other types of host devices and peripheral devices are contemplated and further examples are described below relative to FIG. 3. Further, while host devices and peripheral devices are distinguished for purposes of explanation, the present concepts can be applied to either or both types of devices.

Instances One-Three relate to a packaging scenario, such as where host device 102A and peripheral device 102B are packaged on an assembly line for shipping to a distributer, retailer, and/or end use consumer. Instances Four-Six relate to an un-packaging scenario, such as when the end use consumer un-packages the host and peripheral devices for use.

In this example, at Instance One, host device 102A is shown already positioned in protective packaging 104 and arrow 106 indicates that peripheral device 102B can be positioned in the protective packing 104. In Instance One, the peripheral device may be in a relatively high energy state, such as a testing state where it undergoes quality control. Further, the peripheral device 102B may already be paired with the host device 102A or ready to pair for wireless communications according to various wireless protocols, such as Bluetooth low energy (BLE), 802.11xx, etc.

Instance Two shows peripheral device 102B positioned in the protective packaging 104. The peripheral device can sense that it is positioned in the protective packaging. In this implementation, the peripheral device can sense a magnet 108 as an indication that the peripheral device is positioned in the protective packaging. In the illustrated configuration, the magnet 108 is positioned within the protective packaging 104 in a manner such that the magnet may not be visible and as such the magnet is shown in ghost (e.g., dashed lines). Further, the peripheral device can generate a user-perceptible signal 110 that indicates to the user that the peripheral device recognizes that it is positioned in the protective packaging. In this case, the user-perceptible signal 110 is manifest as a sequence of light flashes emitted by the peripheral device. Responsive to detecting that it is positioned in the protective packaging, the peripheral device 102B can transition from the relatively high energy state of Instance One to a relatively low energy state, such as a shipping state as shown in Instance Three. The peripheral device is now ready for extended periods of shipping and storage with very low power usage. Thus, peripheral device 102B can be shipped in a ready state (e.g., ready to use when removed from the packaging) without any user action, such as installing the battery. Yet, the relatively low power shipping state uses vary little battery resources. For instance, the lower power shipping state may use less than 50% of the battery's energy reserves in a year, for example.

FIG. 2 shows a subsequent unpacking scenario relating to system 100. At Instance Four, the host device 102A and the peripheral device 102B are still positioned in protective packaging 104 where a user 202, such as an end use consumer, can remove them from the protective packaging. At this point, the peripheral device remains in the relatively low energy shipping state introduced above relative to Instance Three.

At Instance Five, the user 202 removes the peripheral device 102B from the protective packaging 104. The peripheral device can automatically sense that it has been removed from the protective packaging and transition from the relatively low power shipping state to a relatively higher power active or user state. No affirmative action is required on the part of the user to power up the peripheral device. For instance, the user does not need to install the battery, turn on a power switch, etc. before being able to use the peripheral device. In the illustrated configuration, the peripheral device 102B, as part of the transition to the active state, can communicate with host device 102A via a wireless protocol as indicated at 204 and 206, respectively. Thus, the peripheral device can be ready to use by the user simply unpacking the peripheral device.

Instance Six shows the user 202 able to immediately use the peripheral device 102B and the host device 102A in an intuitive manner without any affirmative action on the part of the user and without having to read instructions for readying the peripheral device for use. In the illustrated case, the user can use the peripheral device to engage the host device without first having to perform any operational actions on the peripheral device, such as installing the battery or selecting to pair the peripheral device with the host device.

From one perspective, the concepts introduced relative to FIGS. 1-2 can relate to a host device 102A and a peripheral device 102B positioned in protective packaging. The peripheral device can be configured to sense when the peripheral device is positioned in the protective packaging and to transition to a relatively low power shipping state while positioned in the protective packaging. The peripheral device can also be configured to detect when the peripheral device is removed from the protective packaging and to transition to a relatively high power active state when the peripheral device is removed from the protective packaging. The high power active state can allow the peripheral device to communicate with the host device in accordance with a wireless protocol. As mentioned above, similar features can be applied to the host device to enhance the user experience.

Figure 3:
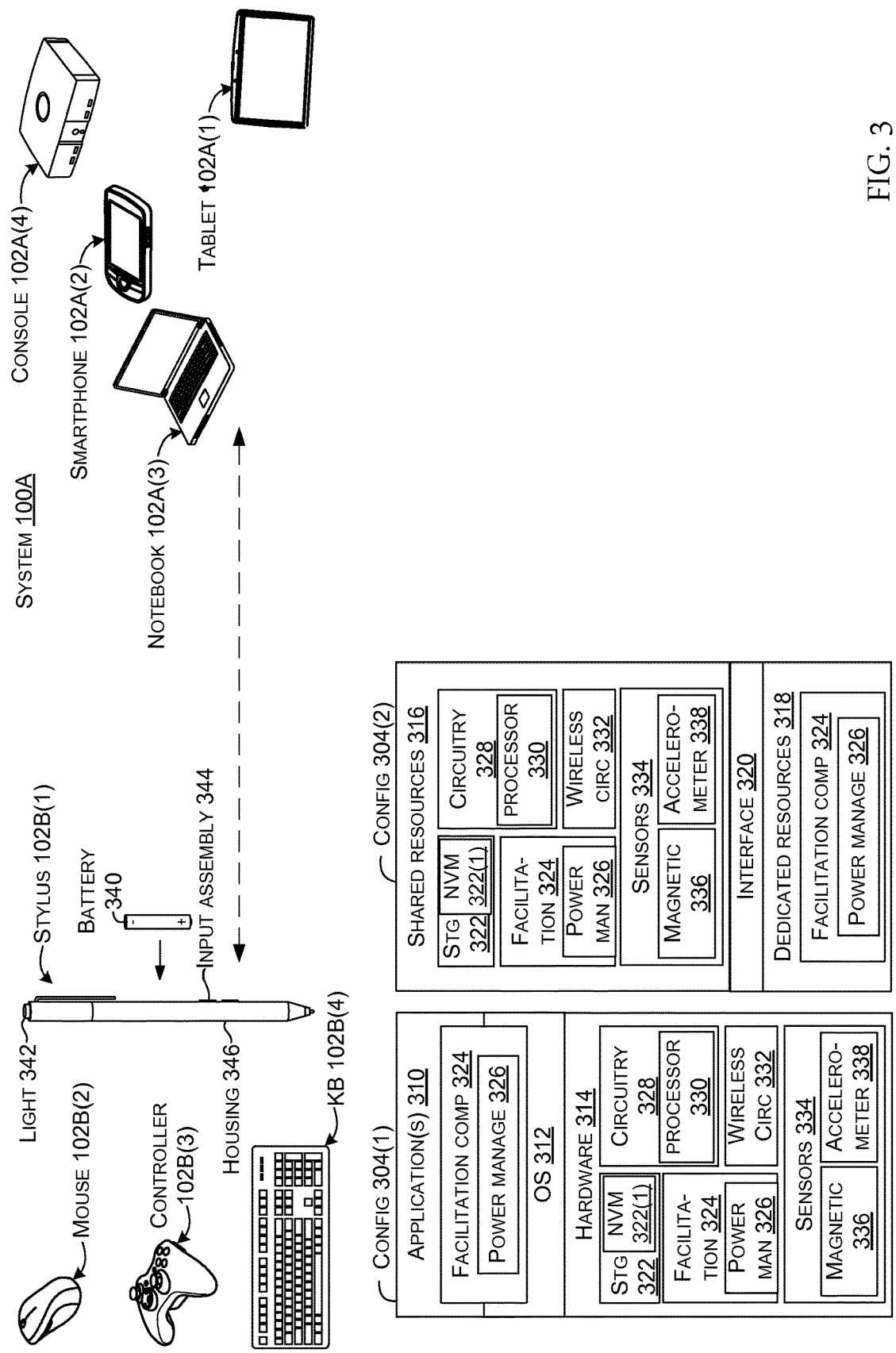
FIGS. 3, 7, and 8 show system examples in accordance with some implementations of the present concepts.

FIG. 3 shows a similar system 100A and offers details about example host and peripheral device 102A and 102B. In this case, system 100A includes several example peripheral devices 102B(1)-102B(4) and several example host devices 102A(1)-102A(4). Peripheral device 102B(1) is manifest as a stylus, similar to stylus 102B of FIGS. 1-2. Peripheral device 102B(2) is manifest as a mouse, peripheral device 102B(3) is manifest as a controller, such as an entertainment or video game controller, and peripheral device 102B(4) is manifest as a wireless keyboard. Other peripheral devices can include speakers, head sets, wearables, and/or Internet of Things devices, among others. Host device 102A(1) is manifest as a tablet, similar to tablet 102A of FIGS. 1-2, host device 102A(2) is manifest as a smart phone, host device 102A(3) is manifest as a notebook computer, and host device 102A(4) is manifest as an entertainment or gaming console. Other types of host devices such as wireless routers, appliances, and/or vehicles, among others, can be employed.

Two example device configurations 304(1) and 304(2) are illustrated that can be used to implement peripheral devices 102B. Example device configurations for host devices 102A are described below relative to FIG. 7.

Briefly, configuration 304(1) represents an operating system centric configuration, and configuration 304(2) represents a system on a chip configuration (SOC). Configuration 304(1) is organized into one or more applications 310, operating system 312, and hardware 314. Configuration 304(2) is organized into shared resources 316, dedicated resources 318, and an interface 320 therebetween.

In either configuration 304(1) or 304(2), the peripheral device 102B can include storage/memory (e.g., computer-readable storage media) 322, such as non-volatile memory 322(1), a facilitation component 324 that can include a power management module 326, circuitry 328 that can include a processor 330, wireless circuitry 332, sensors 334 including a magnetic sensor 336 and/or an accelerometer 338, a battery 340 (or other power source), a light 342, input assembly 344, such as a switch, and/or a housing 346.

Operating system centric configuration 304(1) offers two options for implementing the facilitation component 324 and/or the power management module 326. First, the facilitation component 324 and/or the power management module 326 can be manifest as part of the operating system 312, as application 310, and/or application part of application 310. Alternatively, the facilitation component 324 and/or the power management module 326 can be manifest as firmware and/or on hardware 314, such as on circuitry 328, which can include application specific integrated circuits (ASICs), field programmable gate arrays (FPGAs), and/or other circuitry, such as hardware processor 330.

As mentioned above, configuration 304(2) is considered to be a system on a chip (SOC) type design. In such a case, functionality provided by the device can be integrated on a single SOC or multiple coupled SOCs. One or more processors 330 can be configured to coordinate with other shared resources 316, such as memory/storage 322, etc., and/or one or more dedicated resources 318, such as hardware blocks configured to perform certain specific functionality. Thus, the term "processor" as used herein can also refer to central processing units (CPUs), graphical processing units (CPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Facilitation component 324 and/or power management module 326 can be manifest as part of the operating system 312, application 310, an application part, and/or an application program interface, or on hardware, among other options. For instance, the facilitation component 324 and/or power management module 326 can be manifest on circuitry 328. The circuitry 328 can be manifest as processor 330, an ASIC, or a FPGA, among other configurations.

The power management module 326 can manage the peripheral device 102B's power state to conserve battery resources and yet increase convenience to the user. For instance, the power management module can operate cooperatively with sensors 334 to determine when the peripheral device is positioned in the protective packaging (104, FIGS. 1-2). The power management module can use the positional information (solely or with other parameters) as a trigger to transition to a relatively low power shipping state while positioned in the protective packaging. The power management module can operate cooperatively with the sensors to detect when the peripheral device is removed from the protective packaging. The power management module can use removal from the protective packaging (solely or with other parameters) as a trigger to transition to a relatively high power active state. The relatively high power active state can allow the peripheral device's wireless circuitry 332 to communicate with the host device 102A in accordance with a wireless protocol.

Magnetic sensor 336 can be manifest in various sensor types, such as a Hall Effect sensor or a magnetoresistive sensor, among others. Power management module 326 can utilize output from the magnetic sensor 336 to determine whether the peripheral device is positioned in the protective packaging. Upon determining that the peripheral device is positioned in the protective packaging, the power management module can power down the peripheral device 102B into a low power state, such as a shipping state. The power management module can cause a user perceptible indication to be generated by light 342 of the power state change. Once in the low power state, the power management module can operate the peripheral device in a manner that reduces battery usage for an extended period of time.

Once the peripheral device 102B is in the lower power state, the power management module 326 can attempt to detect whether the peripheral device is being removed from the protective packaging. In one example, the magnetic sensor 336 can be manifest as a Hall Effect sensor that can generate signals indicative of whether the peripheral device is still positioned proximate to the magnet 108 in the protective packaging 104 (FIGS. 1-2).

In another implementation, the magnetic sensor 336 can operate cooperatively with other sensors. For instance, in one case, the magnetic sensor can be manifest as a magnetoresistive sensor that operates cooperatively with accelerometer 338 to detect whether the peripheral device 102B is positioned in the protective packaging 104. For example, in one configuration the power management module 326 may not continuously monitor the magnetic sensor 336. Instead, the power management module may use a staged or tiered approach that initially employs another sensor type. For instance, power management module 326 may disconnect the magnetic sensor from the battery 340 and instead monitor the accelerometer 338.

When the power management module 326 receives an acceleration event from accelerometer 338 that approximates an expected signal when a user removes the peripheral device from the protective packaging 104, the power management module can responsively poll the magnetic sensor 336, such as a magnetoresistive sensor, to determine/confirm whether the peripheral device 102B is still proximate to the magnet. For instance, the acceleration event can be compared to a defined threshold that approximates a user removing the peripheral device from the protective packaging or a profile of the acceleration event can be compared to an expected acceleration profile of a user removing the peripheral device from the protective packaging. Then the results can be confirmed with the magnetic sensor. Such a configuration can accurately detect removal of the peripheral device (e.g., few false positives and false negatives) and still use less power than relying solely on the magnetic sensor 336 which might consume more power per unit time and/or sensing event than the accelerometer 338.

Stated from one perspective, this implementation can utilize a tiered sensing technique that starts with a low energy usage sensor (e.g., in this case the accelerometer) and only after getting an indication from the low energy usage sensor does the power management module dedicate power to the higher power use sensor (e.g., in this case, the magnetic sensor) to determine if the peripheral device is still in the protective packaging.

Upon determination that the peripheral device 102B has been removed from the protective packaging (104, FIG. 1), the power management module 326 can transition the peripheral device from the low energy shipping state to a higher energy active state. In some implementations, among other actions to enhance the user experience, the facilitation component 324 may then automatically cause the peripheral device's wireless circuitry 332 to enter a wireless protocol compliant advertising/broadcasting mode or otherwise facilitate wireless communication between the peripheral device and the host device 102A. This configuration can reduce and/or eliminate any affirmative steps that the user may otherwise have to perform before the devices are ready to use together.

Viewed from one perspective in some implementations, the facilitation component 324 and/or the power management module 326 can use magnetic sensor 336 (e.g., Hall Effect, magnetometer, etc.) to detect a magnetic or ferrous element in the packaging 104. When the peripheral device 102B is first assembled at the factory, power management module 326 can look for the presence of this magnetic element to enter into the relatively low power shipping mode. This shipping mode can be a very low-power mode with limited functionality enabled.

While in shipping mode, power management module 326 can look for the removal of this trigger magnetic/ferrous element. This can be triggered by a motion/shock event (accelerometer 338), an interrupt from the magnetic sensor 336, and/or a returned value from polling the magnetic sensor, for example.

Once the removal from the protective packaging 104 is confirmed (e.g., such as in multi-sensor staged or tiered configurations), the power management module 326 can exit shipping mode and enter normal consumer operation. The facilitation component 324 can also take additional steps to enhance the user experience, such as automatically wirelessly pairing with other devices, such as host devices 102A.

Wireless circuitry 332 can include a receiver and a transmitter and/or other radio frequency circuitry (and/or other components, such as analog-to-digital converters, rectifiers, etc.) for communicating via various formats, such as cellular, Wi-Fi (IEEE 802.xx), Bluetooth, Bluetooth Low Energy (LE), etc.

Note that while specific types of sensors 334 are illustrated, other examples of sensors that can be used to sense whether the peripheral device 102B is packaged in the protective packaging 104 can include: pressure sensors, proximity sensors, gyroscopes, inertial sensors, capacitors, and/or microphones, among others.

Host devices 102A and peripheral devices 102B can be viewed as computing devices or devices. The term "device," "computer," or "computing device" as used herein can mean any type of device that has some amount of processing capability and/or storage capability. Processing capability can be provided by one or more processors 330 that can execute data in the form of computer-readable instructions to provide a functionality. Data, such as computer-readable instructions and/or user-related data, can be stored on storage 322 that can be internal or external to the computer. The storage can include any one or more of volatile or non-volatile memory 322(1), hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, non-volatile memory, and/or flash memory, among others.

Viewed from one perspective, the concepts introduced relative to FIGS. 1-3 can involve the use of a sensor 334, such as a magnetic sensor 336 that can allow the peripheral device 102B to be transitioned to a low-power mode until it is removed from the protective packaging 104. This can allow for a 'clean' out of box experience without needing to open the device to insert a battery 340. Further, the concepts can enable the peripheral device to ship with the battery pre-installed at a reduced/minimal power drain. This can mitigate the negative effects of shipping vibrations (e.g., as may be associated with a pure acceleration-based solution). This can also enable a clean, user-transparent means to resume normal operation once the peripheral device 102B is removed from the packaging. These configurations can also automatically enable an auto-pairing feature to be available to the user immediately when the peripheral device is removed from the protective packaging. These configurations can also prevent unintended pairing during manufacturing and can reduce needed packaging volume by the size of the battery since the battery is already installed in the device. In contrast, previous solutions have just shipped with the battery removed, or with a pull-tab barrier to break the connection. Shipping without the battery installed can allow the user to install the battery backwards, accidentally lose the battery, break the device while trying to open it to install the battery, and/or miss the window for auto-pairing during out-of-box. Further, utilizing a pull-tab does not enable the ideal vision of a clean, gapless/seamless peripheral device.

Figure 4:
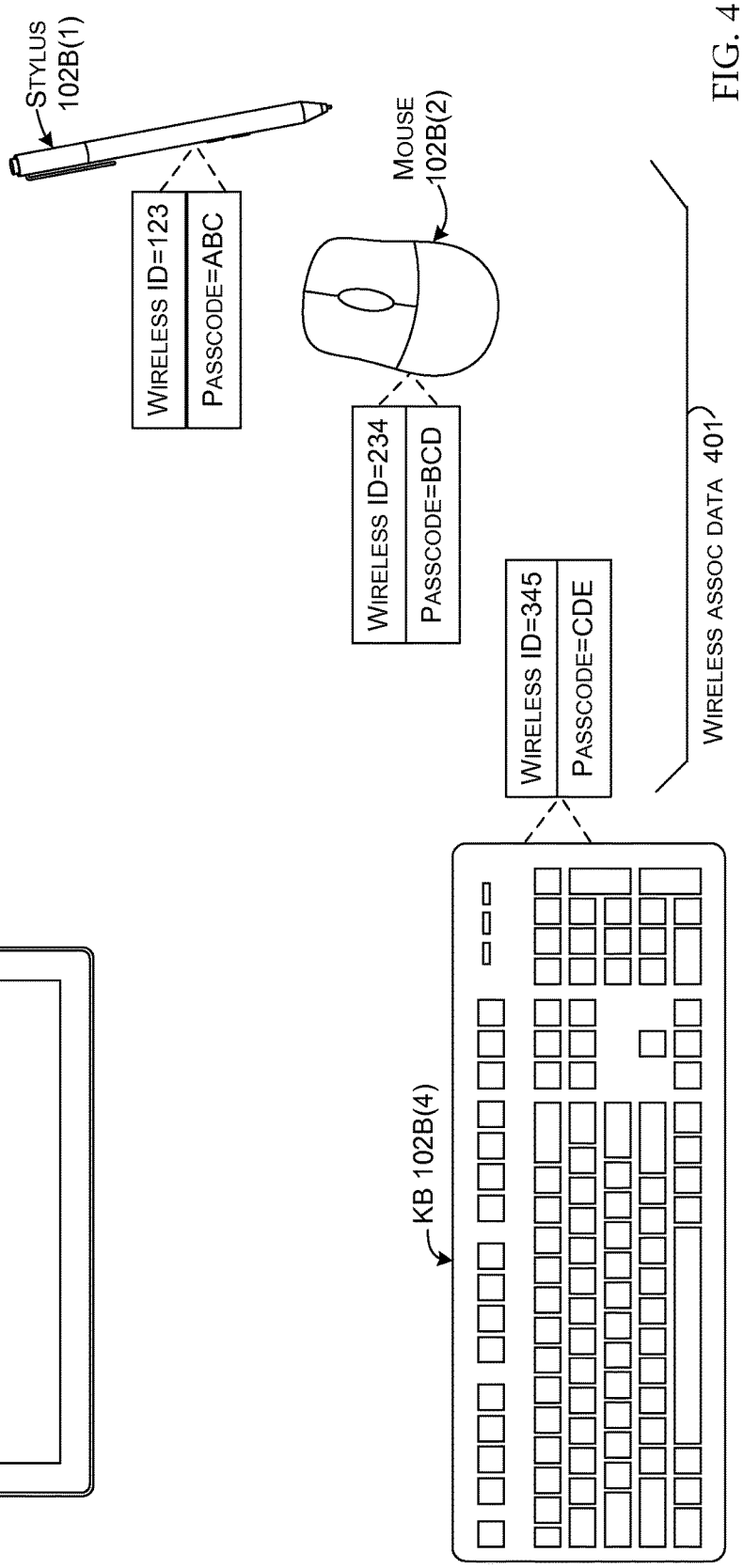
Figure 5:
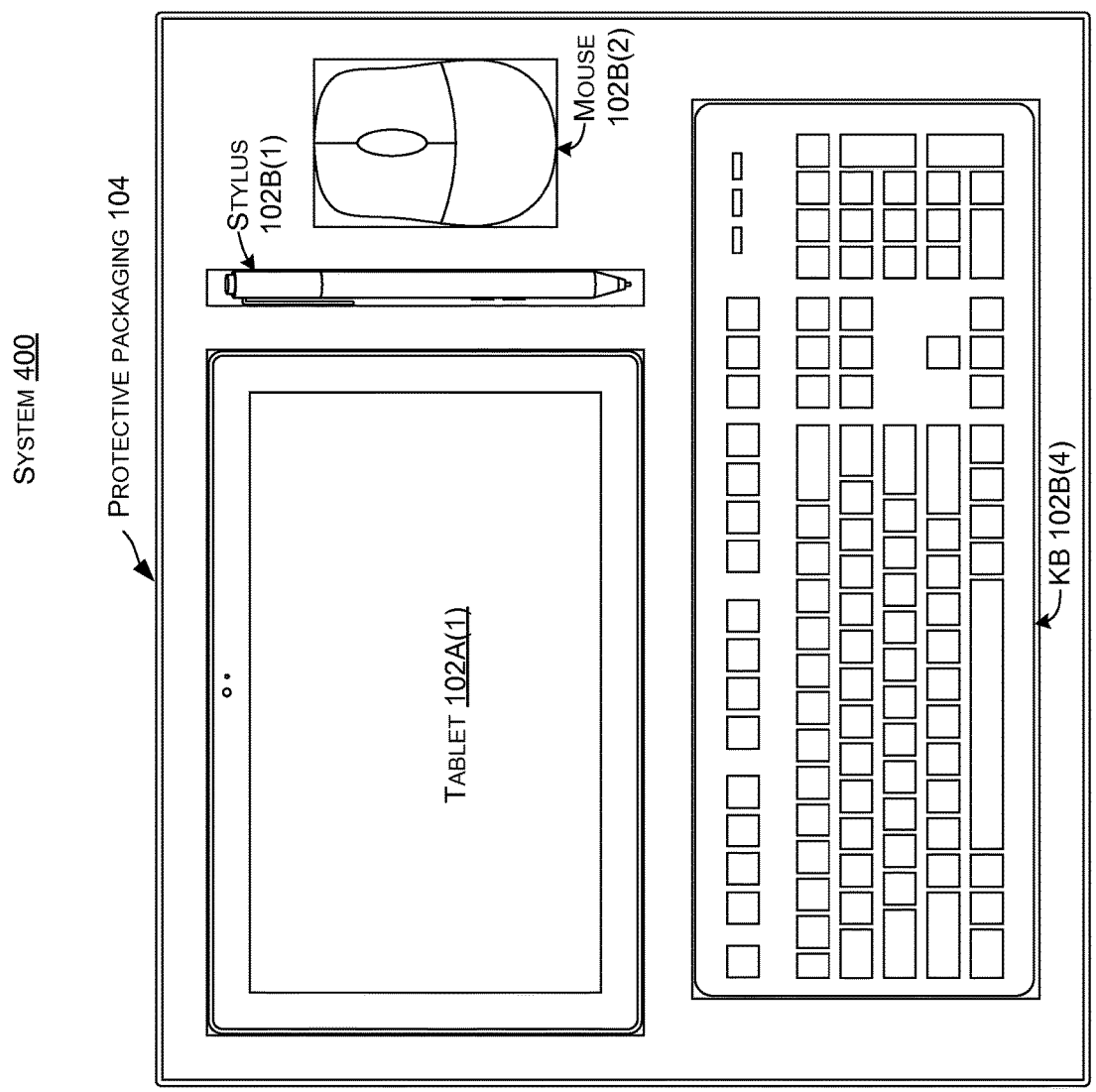
Figure 6:
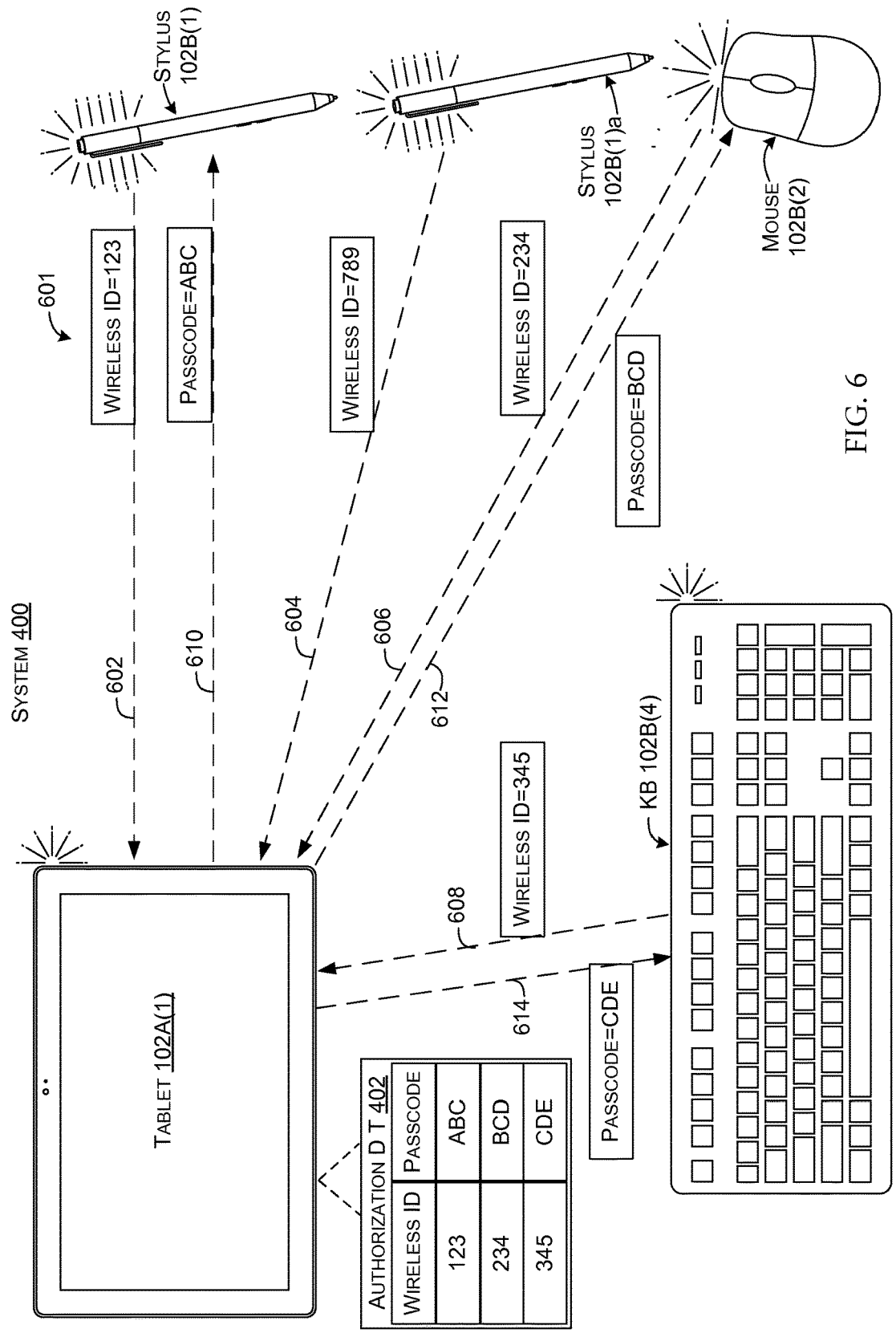

FIGS. 4-6 collectively illustrate another system 400 implementation that facilitates secure automatic wireless pairing of host and peripheral devices 102A and 102B. In this case, the peripheral devices 102B(1), 102B(2), and 102B(4) are intended to function cooperatively with host device 102A(1). For instance, these peripheral devices and the host device could be sold together as a set that can be packaged together. Toward this end, FIG. 4 shows wireless association data or information 401 about the peripheral devices 102B(1), 102B(2), and 102B(4). In this case, the wireless association data is manifest as a wireless ID and passcode for each peripheral device. For example, in the Bluetooth low energy (LE) format, the wireless association data can include a manufacturing identification number or Bluetooth address of the individual peripheral device. This wireless association data is stored in an authorization data table 402 on the host device 102A(1). For instance, relative to the stylus wireless device 102(B)1, the wireless ID is "123" and the passcode is "ABC." This wireless association data can be stored on the stylus and is also stored on the first row of the authorization data table 402. In some scenarios, the wireless association data can be stored on the peripheral devices and on the host device data table as part of the manufacturing process. In other cases, this storage can be accomplished by an intermediary entity, such as a distributer or vendor that prepares the devices for an end use consumer.

FIG. 5 shows the host device 102A(1) and the peripheral devices 102B(1), 102B(2), and 102B(4) packaged together as a set in protective packaging 104 for shipping. The peripheral devices 102B(1), 102B(2), and 102B(4) may or may not be configured to sense that they are positioned in the protective packaging and to responsively transition to a low power state as described relative to FIGS. 1-3.

FIG. 6 shows the host device 102A(1) and the peripheral devices 102B(1), 102B(2), and 102B(4) removed from the packaging 104 and powered up for use. Further, FIG. 6 includes extra peripheral device 102B(1)a in the form of a second stylus, but could be in any other peripheral device form factor. The purpose of including the extra peripheral device should become apparent from the description below. Briefly, the extra peripheral device 102B(1)a could simply be a peripheral device belonging to the person in the next cubicle that is close enough to communicate with the host device 102A(1). Alternatively, the extra peripheral device could be a nefariously placed device that is intended to gain access to host tablet 102A(1) and compromise the functioning of the host tablet.

Upon powering up, the peripheral devices 102B(1), 102B(1)a, 102B(2), and 102B(4) can attempt to communicate with a host device (in this case, host device 102A(1)) via wireless information 601 relating to one or more wireless protocols. Toward that end, the peripheral devices 102B can enter an advertising mode where they broadcast their respective individual wireless IDs (and/or other identifying wireless association data). For instance, arrow 602 shows stylus 102B(1) broadcasting its wireless ID "123," arrow 604 shows stylus 102B(1)a broadcasting its wireless ID "789," arrow 606 shows mouse 102B(2) broadcasting its wireless ID "234," and arrow 608 shows keyboard 102B(4) broadcasting its wireless ID "345." In some implementations, this broadcasting can occur automatically without any affirmative user actions. Host tablet 102A(1) can receive the broadcast information.

Rather than simply establishing communications with every advertising peripheral device or requiring the user to specify which individual peripheral device to establish communication with, the host tablet 102A(1) can automatically establish communications with the approved peripheral devices 102B of the set (e.g., the ones in the authorization data table 402). For instance, the host tablet 102A(1) can compare the wireless ID "123" received from stylus 102B(1) to wireless ID values stored in the authorization data table 402. Since this value is in the data table (e.g., in the first row), the host device can use other wireless information from the authorization data table associated with wireless ID "123" to automatically respond to peripheral stylus 102B(1).

In this example, the host device 102A(1) can reply with the associated passcode "ABC" from the authorization data table 402 as indicated by arrow 610. This exchange of wireless association data can allow the host tablet to securely wirelessly pair with stylus 102B(1). In contrast, the wireless ID "789" from peripheral stylus 102B(1)a does not occur in the host device's authorization data table 402. As such, the host tablet does not automatically respond to peripheral stylus 102B(1)a. In some implementations, this may be the end of the process relative to peripheral stylus 102B(1)a. In other implementations, the host tablet may query the user whether he/she wants to manually approve pairing with the peripheral stylus 102B(1)a. Arrows 612 and 614 show how, upon finding a match in the authorization data table, the host tablet can respond to peripheral mouse 102B(2) and peripheral keyboard 102B(4), respectively to automatically attempt to wirelessly pair with these devices. From one perspective, this implementation can provide both enhanced user convenience by automatically pairing with authorized peripheral devices and enhanced security by only automatically pairing with authorized peripheral devices and not other advertising peripheral devices that are within range of the host device.

Figure 7:
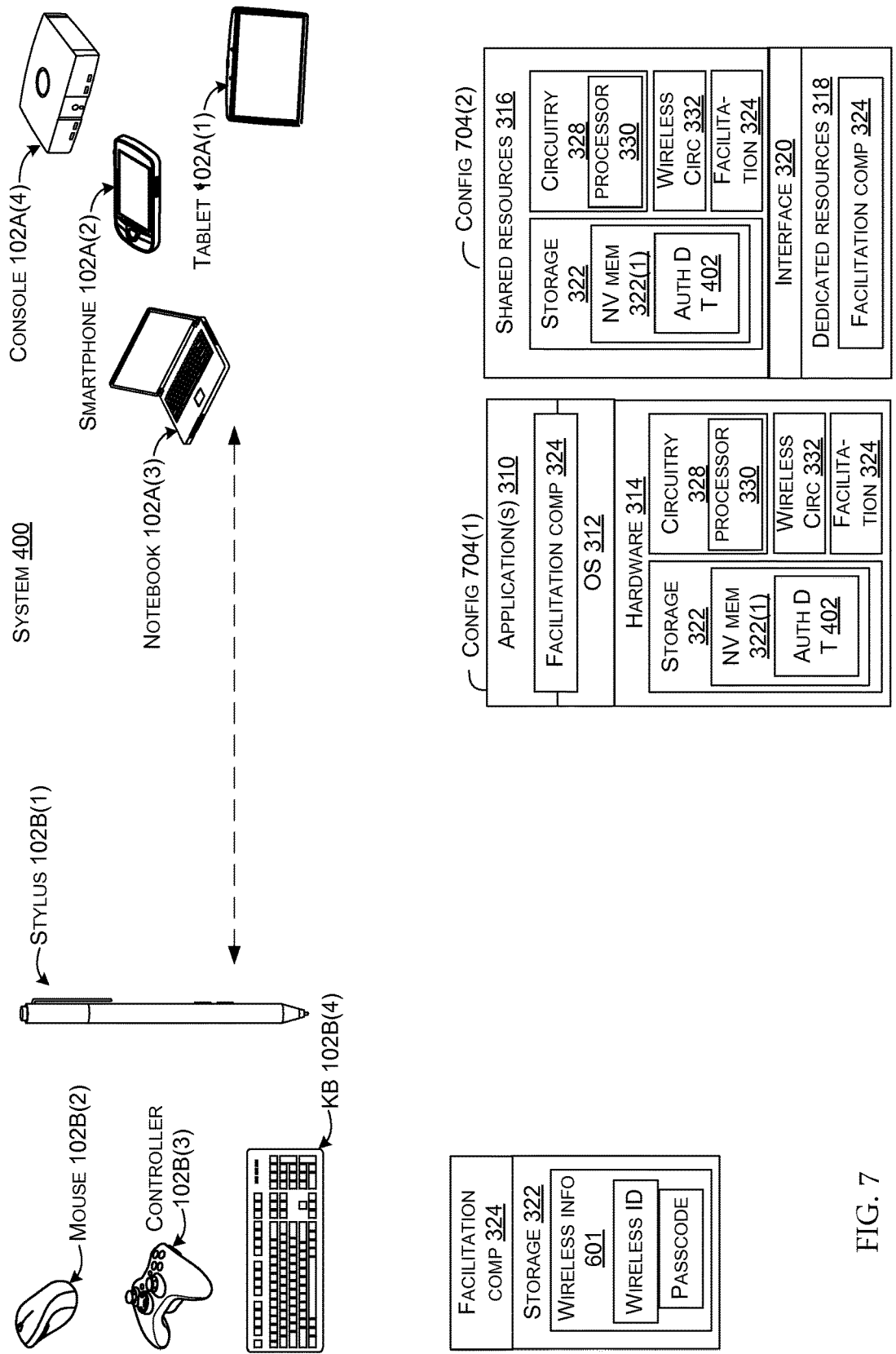

FIG. 7 shows example system components on peripheral devices 102B(1)-102B(4) and host devices 102A(1)-102A (4). Example peripheral device components are discussed extensively above relative to FIG. 3 and as such are addressed in an abbreviated manner here for the sake of brevity. Specifically, facilitation component 324 and storage 322 are recalled from FIG. 3. Wireless information 601 can be stored on storage 322 and can include for example, the wireless ID and/or passcode of the individual peripheral device as introduced relative to FIG. 6.

In this implementation, host devices 102A can be manifest in two basic configurations 704(1) and 704(2) which are operating system centric and system on a chip configurations, respectively. Many of the components in these configurations are discussed above relative to FIG. 3 and as such are addressed in an abbreviated manner here. Of note is the addition of the authorization data table 402 on the storage 322, such as on non-volatile memory 322(1).

In this configuration, the facilitation component 324 can automatically facilitate wireless pairing of host device 102A and peripheral devices 102B on behalf of an end use consumer. In many cases, the facilitation component 324 can automatically facilitate this wireless pairing as soon as the end use consumer removes the devices from the protective packaging 104 and/or upon power-up. For instance, FIGS. 1-3 explain a scenario where devices can automatically detect removal from packaging and responsively power up. In other cases, the user may manually power up the devices. In either case, the facilitation component can automatically pair peripheral devices listed in the host device's authorization data table 402 and not pair other peripheral devices as described relative to FIG. 6.

Toward this end, a manufacturer or intermediary can store wireless association data relating to individual peripheral devices 102B in the authorization data table 402 of the intended host device 102A.

In some configurations, the authorization date table 402 and a (at least a portion of) the facilitation component 324 can be stored outside of the operating system (OS) 312, such as in the form of firmware. Stated another way, the authorization data table can be accessible on storage, such as non-volatile memory 322(1) without the operating system running. The facilitation component can be executed outside of the operating system realm. For instance, this functionality of the facilitation component can be accomplished as firmware code or circuitry, such as an ASIC or FPGA that reads the authorization data table 402 on the non-volatile memory 322(1) that is outside of the operating system and utilizes the authorization data table's wireless association data to facilitate automatic pairing with the listed peripheral devices. For example, the facilitation component can work directly with the host device's wireless circuitry 332 to accomplish the pairing. In another example, the facilitation component can push the wireless association data from the authorization data table to the operating system 312, to an application 310 operating on top of the operating system, and/or to a software portion of the facilitation component operating cooperatively with the operating system and/or application.

Figure 8:
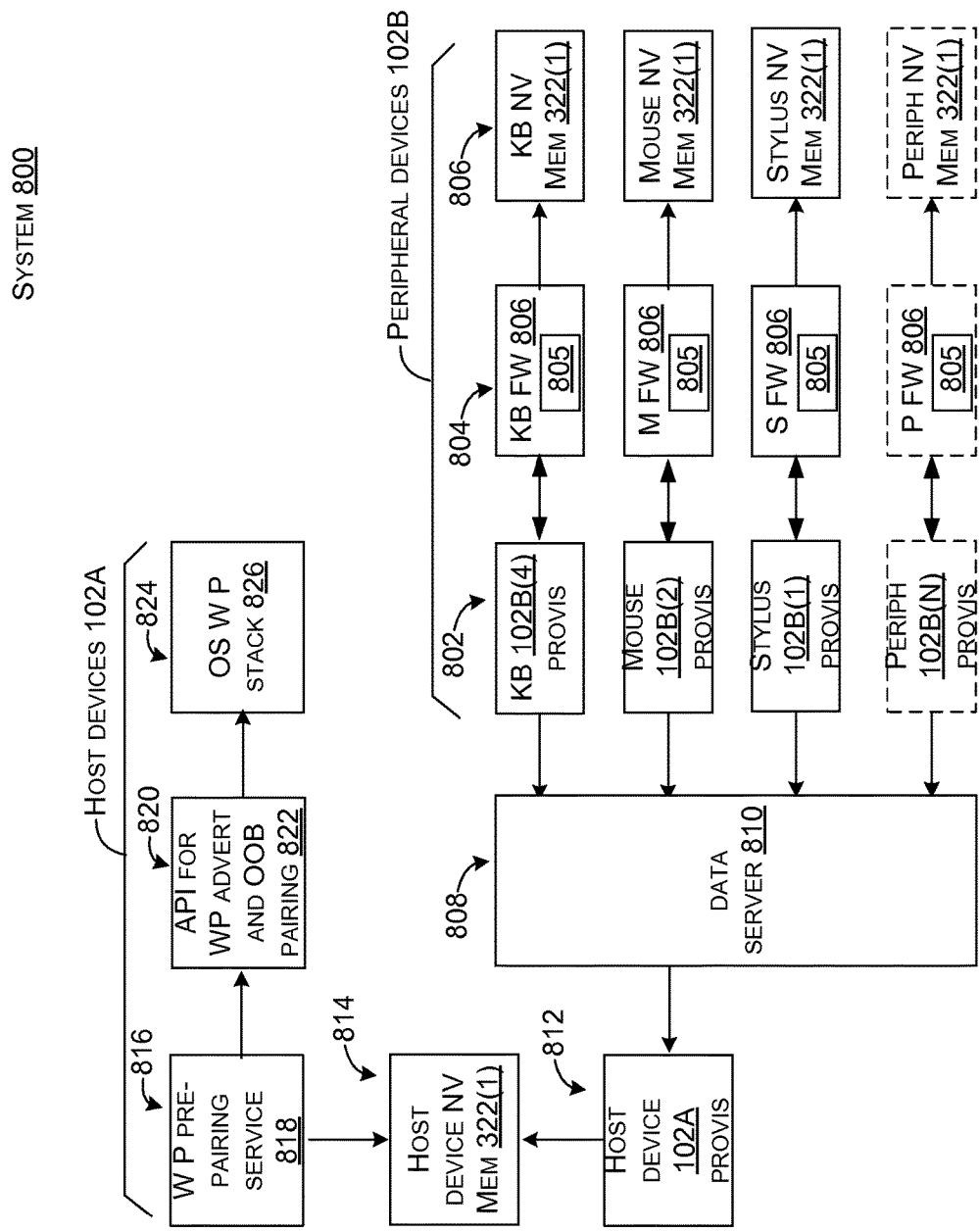

FIG. 8 shows an example configuration where a system 800 can configure peripheral devices 102B to implement the present concepts. This configuration can be applied in multiple different scenarios. For instance, the configuration can be applied by a manufacturer or assembler who makes peripheral devices 102B and/or host devices 102A or who obtains peripheral devices and/or host devices from other manufacturers and packages and prepares them for shipping together as a set for use by an end user. As mentioned above, the present concepts can be applied to various wireless technologies to enhance the end user experience via ease of use and/or security. Toward this end, one or more peripheral devices 102B can be configured for automatic pairing with a host device (e.g., FIG. 4). For instance, the peripheral devices and the host device can be packaged together as a set for delivery together to an end use consumer (e.g., FIG. 5). The process can be repeated for additional sets of devices. This particular implementation is explained relative to the wireless protocol Bluetooth LE (e.g., "BLE"), but can alternatively or additionally be applied to other wireless protocols.

For purposes of explanation, the description starts with peripheral device provisioning 802 of wireless association data for each included peripheral device 102B (e.g., in this case, a keyboard 102B(4), mouse 102B(2), pen/stylus 102B (1), and a generic peripheral device 102B(N) that represents other types). In this case, the wireless association data is manifest as a BlueTooth Low energy (BLE) Out of Band (OOB) key 805 (e.g., the key can be an example type of passcode and/or device ID as introduced above relative to FIG. 4). Alternatively, the system 800 could put custom data into the Manufacturer Specific data of the AD frame that "mimics" a unique BLE address. At 804, wireless authorization information, in the form of BLE OOB key 805, for each peripheral device is associated with firmware 806 on the peripheral device that can implement pairing instructions that utilize the BLE OOB key 805. As mentioned above relative to FIGS. 3 and 7, other implementations can utilize software and/or hardware circuitry rather than firmware. At 806, the BLE OOB key can be stored in a non-volatile memory 322(1) or other storage 322 that is outside of the OS context.

At 808, the BLE Out of Band (OOB) key for each peripheral device 102B can be stored in a data server 810. For instance, the data server can be maintained by the manufacturer, an intermediary, or some other entity. Stated another way, the data server 810 can store wireless association data for sets of peripheral and host devices. At 812, the host device 102A can be provisioned with the BLE OOB keys 805 from the peripheral devices 102B that are intended to be used with the host device 102A (e.g., the peripheral devices and the host device of the set in FIG. 5).

At 814, the peripheral device BLE OOB keys 805 can be stored on storage of the host device 102A, such as non-volatile memory 322(1). In the implementation described relative to FIGS. 4-6, this storage was organized on the authorization data table (402, FIG. 4).

When the end use consumer unpacks the peripheral devices 102B and the host device 102A, at 816 the host device's wireless protocol pairing service 818 can automatically obtain the peripheral device BLE OOB keys 805 stored on the host device's non-volatile memory 322(1). In this implementation, the host device's wireless protocol pairing service 818 can be operable before or independent of the host device's operating system (312, FIG. 7). At 820, the host device's wireless protocol pairing service 818 can hand the peripheral devices' BLE OOB keys 805 to an API for the wireless protocol's advertising and OOB pairing 822. The API can pass communication to the operating system's wireless protocol stack at 824. At 824, the API can provide the BLE OOB keys 805 and/or other wireless authorization information to the operating systems wireless protocol stack 826. The operating system's wireless protocol stack 826 can facilitate communication between the host device 102A and the peripheral devices 102B without affirmative user involvement.

From one perspective, some configurations of the host device's wireless protocol pairing service 818 can be implemented as firmware code that reads non-volatile memory 322(1) that is outside of OS context and pushes this data to an application 310 in the production/customer operating system. This background app (for example, one aspect of the facilitation component 324 of FIG. 6) can automatically complete OOB pairing of the host device 102A with the associated peripheral devices 102B, but not other peripheral devices.

From one perspective, this process can allow the wireless protocol pairing service 818 to register for notification when the host device 102A listens for BLE devices with Bluetooth and identities a match stored on the host device's non-volatile memory 322(1). When matches are detected, OOB pairing can be performed.

The BLE peripheral device 102B can automatically enter the advertisement mode through firmware implementation described at 804 as soon as the peripheral device is powered up or wakes up from a lower power state, such as a sleep state.

This approach can allow easy incorporation of wireless association information into the existing manufacturing flow since only BLE addresses of peripheral devices 102B are stored on the host device 102A while the peripheral devices do not need to store host BLE addresses.

Note that the device manufacturer can pre-pair multiple devices in the same way with different BT LE addresses and OOB Keys 805. Without the provisioning of the BLE peripheral addresses into the host device during manufacturing, users may accidentally end up pairing with other devices nearby unexpectedly. The present concepts can prevent accidental pairing between peripherals 102B and nearby host devices 102A. This can enhance security relative to existing configurations where the host device may attempt to pair with any peripheral device that is advertising and is within range. Also, the user has the freedom to power up the peripheral device when unpacking (e.g., the out of box experience) or later. The service can terminate itself after all pre-paired peripheral devices have been discovered and bonded. Thus, the system can pair an individual host device only with intended peripheral devices by provisioning OOB key and BLE addresses in the manufacturing. This OOB key and BLE address data can be stored on the host device outside of OS context so that it can be programmed during manufacturing and yet can persist and be made available to the customer/production operating system. The system can use a background service app (e.g. facilitation component 324 of FIG. 7) on the host device to search intended peripheral devices and complete OOB pairing. The system can pair BLE peripherals such as a keyboard, mouse or pen with the BLE enabled host device at first sight without affirmative user involvement. This can greatly improve the user experience of device pairing. It can have several potential benefits, including no UI required, can be performed at any time during unpackaging or after, offers fast pairing times, and/or can be applied to different wireless protocols beside Bluetooth LE, such as but not limited to Miracast, wireless display, and other technologies where association information should be securely communicated.

Traditionally, Bluetooth pairing between the host device 102A and peripheral devices 102B requires multiple steps to be performed by the user, such as going to a settings menu, finding the Bluetooth option, identifying the device to be paired, etc. Further, the user may not even know that the peripheral has Bluetooth capabilities and thus not even know to complete the pairing process. In contrast, the present implementations can automatically, securely pair the host device with intended peripheral devices yet reduce security risks by not pairing with other advertising peripherals.

Example Methods

Figures 9, 10:
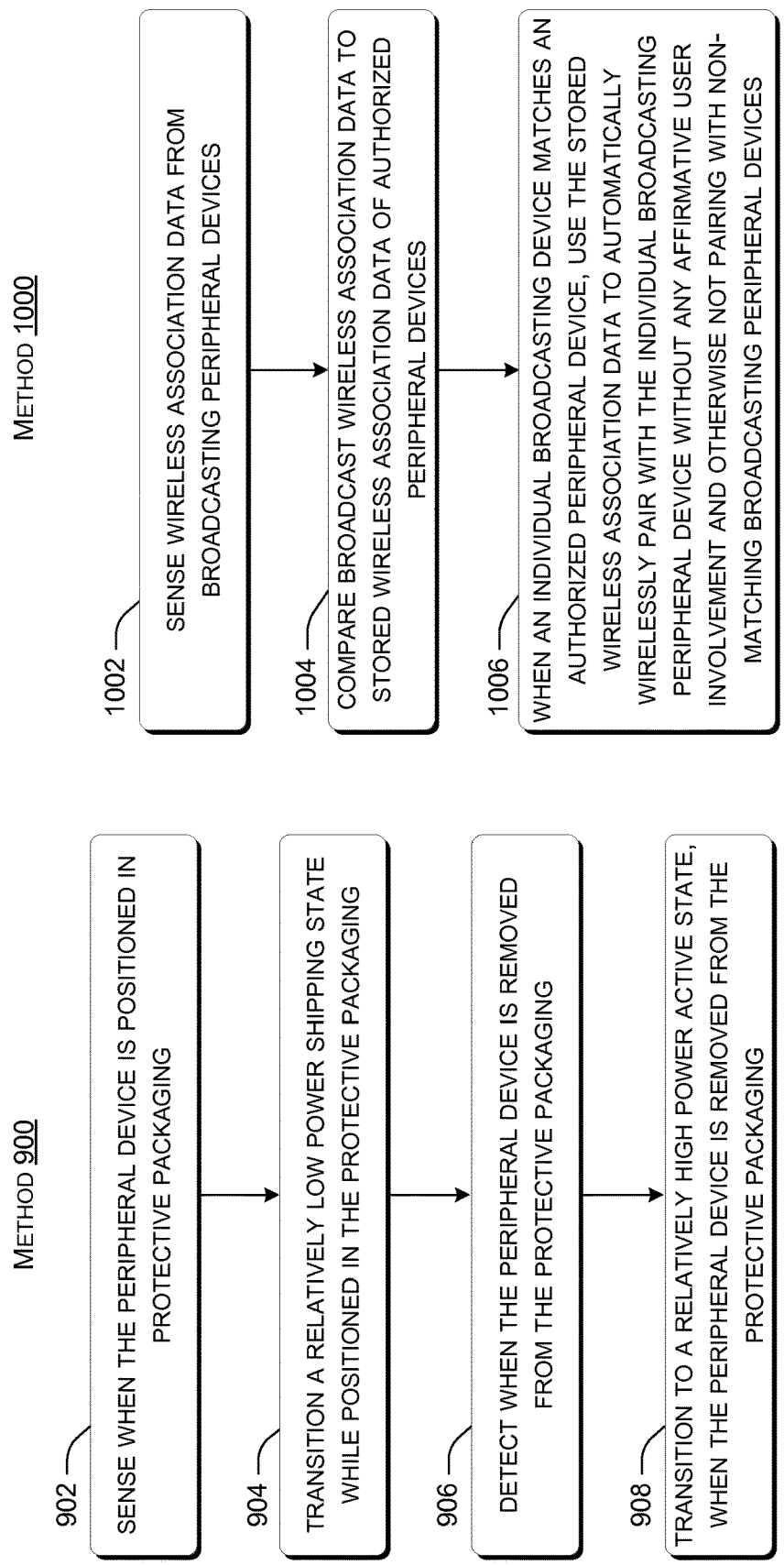
FIGS. 9-10 show example flow charts in accordance with some implementations of the present concepts.

FIG. 9 illustrates a flowchart of a method or process 900 that is consistent with at least some implementations of the present concepts.

At block 902, the method can sense when a peripheral device is positioned in protective packaging.

At block 904, the method can transition the peripheral device to a relatively low power shipping state while positioned in the protective packaging.

At block 906, the method can detect when the peripheral device is removed from the protective packaging.

At block 908, the method can transition to a relatively high power active state, when the peripheral device is removed from the protective packaging.

FIG. 10 illustrates a flowchart of a method or process 1000 that is consistent with at least some implementations of the present concepts.

At block 1002, the method can sense wireless association data from broadcasting peripheral devices.

At block 1004, the method can compare broadcast wireless association data to stored wireless association data of authorized peripheral devices.

At block 1006, the method can, when an individual broadcasting device matches an authorized peripheral device, use the stored wireless association data to automatically wirelessly pair with the individual broadcasting peripheral device without any affirmative user involvement and otherwise not pair with non-matching broadcasting peripheral devices.

The described methods or processes can be performed by the systems and/or devices described above, and/or by other devices and/or systems. For instance, the methods can be performed by the facilitation component (324, FIGS. 3 and 7). The order in which the methods are described is not intended to be construed as a limitation, and any number of the described acts can be combined in any order to implement the method, or an alternate method. Furthermore, the method can be implemented in any suitable hardware, such as circuitry, software, firmware, or combination thereof, such that a device can implement the method. In one case, the method is stored on computer-readable storage media as a set of instructions such that execution by a processor of a computer device causes the computer device to perform the method.

Further Examples

The above discussion includes multiple examples and additional examples are described below. One example can include a system, comprising a host device and a peripheral device positioned in protective packaging. The peripheral device can be configured to sense when the peripheral device is positioned in the protective packaging and to transition to a relatively low power shipping state while positioned in the protective packaging. The peripheral device is also configured to detect when the peripheral device is removed from the protective packaging and to transition to a relatively high power active state. When the peripheral device is removed from the protective packaging, the transition allows the peripheral device to communicate with the host device in accordance with a wireless protocol.

Another example can include any combination of the above and/or below examples where the protective packaging includes a magnet and where the peripheral device is configured to sense proximity to the magnet to determine whether to place the peripheral device in the relatively low power state or the relatively high power state.

Another example can include any combination of the above and/or below examples where the peripheral device uses multiple sensors to determine when the peripheral device is removed from the protective packaging.

Another example can include any combination of the above and/or below examples where the multiple sensors comprise an accelerometer and a magnetometer.

Another example can include any combination of the above and/or below examples where the peripheral device polls the magnetometer only after the accelerometer senses an acceleration event above a defined threshold.

Another example can include any combination of the above and/or below examples where when the peripheral device transitions from the relatively low power shipping state to the relatively high power active state, the peripheral device attempts to communicate with the host device by engaging in a pairing process with the host device in accordance with the wireless protocol.

Another example can include any combination of the above and/or below examples where the host device comprises a gaming console, an entertainment console, a smart phone, a tablet, or a notebook computing device, and where the peripheral device comprises a wearable device, a stylus, a mouse, a controller, or a keyboard.

Another example can include a device comprising a housing, a battery, a magnetic sensor, and power management circuitry that are electrically coupled and physically positioned in the housing. The magnetic sensor is configured to sense that the housing is positioned proximate to a magnet. The power management circuitry is configured to implement a relatively low power shipping state for the device when the magnetic sensor senses proximity of the magnet and to implement a relatively high power active state for the device when the magnetic sensor does not sense proximity to the magnet.

Another example can include any combination of the above and/or below examples where the power management circuitry is further configured to cause a user-perceptible signal to be generated by the device when implementing the relatively low power state responsive to sensing proximity to the magnet.

Another example can include any combination of the above and/or below examples where the device further comprises a light and wherein the power management circuitry is further configured to generate the user-perceptible signal by sequentially activating and deactivating the light.

Another example can include any combination of the above and/or below examples where the power management circuitry is further configured to cause the device to enter a wireless protocol compliant advertising mode upon the magnetic sensor sensing that the device has been subsequently separated from the magnet.

Another example can include any combination of the above and/or below examples where the magnetic sensor comprises a Hall Effect sensor.

Another example can include any combination of the above and/or below examples where the magnetic sensor comprises a magnetoresistive sensor.

Another example can include any combination of the above and/or below examples where the device further comprises an accelerometer. When in the low power state, the power management circuitry is configured to receive a signal from the accelerometer associated with an acceleration event of the device. Responsive to receiving the signal from the accelerometer, the power management circuitry is responsively configured to poll the magnetoresistive sensor to determine if the device is still proximate to the magnet.

Another example can include any combination of the above and/or below examples where the acceleration event is calibrated to be similar to a human picking up the device.

Another example can include any combination of the above and/or below examples where the device comprises a stylus, a mouse, a keyboard, a wearable, or a game controller.

Another example can include a device comprising power management circuitry coupled to storage, a battery, and a sensor. The power management circuitry is configured to execute computer-readable instructions stored on the storage that cause the power management circuitry to perform a method. When the device is in a first relatively high power use state, the method can receive a first signal from the sensor indicating that the device is packaged. Responsive to receiving the first signal, the method causes the device to transition to a second relatively low power shipping state. When the device is in the second relatively low power shipping state, the method receives a second signal from the sensor indicating that the device is no longer packaged. Responsive to receiving the second signal, the method transitions the device to a third relatively high power use state.

Another example can include any combination of the above and/or below examples where the power management circuitry is implemented as a processor, an ASIC, or an FPGA.

Another example can include any combination of the above and/or below examples where the first relatively high power use state and the third relatively high power use state are the same or where the first relatively high power use state is a testing state and the third relatively high power use state is an end user state.

Another example can include any combination of the above and/or below examples where the device is configured as a host wireless device or where the device is configured as a peripheral wireless device.

Another example can include a system comprising a peripheral device and a host device. The host device includes storage having a stored ID and a corresponding passcode for the peripheral device that is authorized for pairing with the host device. The host device also includes wireless circuitry configured to sense for signals from an individual peripheral device that is in proximity to the host device. The host device further includes a facilitation component configured to compare an ID obtained from the individual peripheral device by the wireless circuitry to the stored ID on the storage, and in an instance where the ID obtained from the individual peripheral device by the wireless circuitry matches the stored ID on the storage, the facilitation component is configured to use the corresponding passcode to pair with the individual peripheral device.

Another example can include any combination of the above and/or below examples where the facilitation component comprises a processor, an ASIC, or a FPGA.

Another example can include any combination of the above and/or below examples where the storage comprises non-volatile memory.

Another example can include any combination of the above and/or below examples where the storage comprises an authorization data table that includes the stored ID and a corresponding passcode.

Another example can include any combination of the above and/or below examples where the system further includes a protective packaging intended for a single end user consumer and where the protective packaging includes both the host device and the peripheral device.

Another example can include any combination of the above and/or below examples where the peripheral device is configured to sense removal from the protective packaging and to responsively begin broadcasting the signals.

Another example can include any combination of the above and/or below examples where the system further includes a database of sets of host devices and peripheral devices that are authorized for wireless association.

Another example can include any combination of the above and/or below examples where the storage can be updated to reflect another ID and another corresponding passcode relating to an additional and/or a replacement authorized peripheral device.

Another example can include a device comprising wireless communication circuitry for communicating with wireless devices in accordance with a wireless protocol, storage storing wireless association data relating to an authorized peripheral device, and a facilitation component. The facilitation component causes the wireless communication circuitry to sense wireless association data from broadcasting peripheral devices, to compare broadcast wireless association data to the stored wireless association data, and when an individual broadcasting peripheral device matches an authorized peripheral device, uses the stored wireless association data to automatically wirelessly pair with the individual broadcasting peripheral device without any affirmative user involvement and otherwise not to pair with non-matching broadcasting peripheral devices.

Another example can include any combination of the above and/or below examples where the device further comprises generating a graphical user interface upon which the user can affirmatively pair with non-matching broadcasting peripheral devices.

Another example can include any combination of the above and/or below examples where the facilitation component is manifest as circuitry.

Another example can include any combination of the above and/or below examples where the circuitry comprises an ASIC or an FPGA.

Another example can include any combination of the above and/or below examples where the facilitation component is manifest as a processor executing computer readable instructions.

Another example can include any combination of the above and/or below examples where the device is manifest as a tablet, a notebook, a smart phone, a desktop computer, or an entertainment console.

Another example can include a system comprising a peripheral device and a host device. The host device includes a facilitation component that compares wireless association data of the peripheral device stored on the host device to wireless association data of broadcasting peripheral devices to identify a match between an individual broadcasting peripheral device and the peripheral device. When a match occurs, the facilitation component uses the wireless association data to automatically pair with the matching peripheral device in accordance with a wireless protocol and does not automatically pair with other individual broadcasting peripheral devices.

Another example can include any combination of the above and/or below examples where the wireless association data comprises a device ID and a passcode.

Another example can include any combination of the above and/or below examples where the wireless association data comprises a Bluetooth low energy address and a key.

Another example can include any combination of the above and/or below examples where the host device further includes storage and an authorization data table stored on the storage. The authorization data table can map individual authorized peripheral devices to associated wireless association data.

Another example can include any combination of the above and/or below examples where the wireless association data comprises a device ID and a passcode.

Another example can include any combination of the above and/or below examples where the facilitation component comprises firmware or hardware.

Another example can include any combination of the above and/or below examples where the facilitation component comprises a firmware portion and a software portion.

CONCLUSION

Although techniques, methods, devices, systems, etc., pertaining to enhancing the user experience relative to peripheral devices are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc. Also, as used herein, 'including' means 'including but not limited to,' 'based on' means 'based at least in part on,' and 'a' means 'one or more.' Also, if interpretation under Section 112 6/f is intended the phrase 'means' or 'step' will be employed. Lacking one of these two explicit recitations, Section 112 6/f is not intended to be invoked.

The invention claimed is:

1. A device, comprising:
   an accelerometer configured to sense an acceleration event of the device, the accelerometer being active while the device is positioned in a protective shipping packaging;
   a magnetometer configured to sense a magnet in the protective shipping packaging;
   a processor configured to receive the acceleration event from the accelerometer and compare the acceleration event with a defined threshold, to poll the magnetometer after receiving the acceleration event above the defined threshold from the accelerometer, to transition the device to a low power shipping state when an output from the magnetometer indicates that the device is positioned in the protective shipping packaging, and to transition the device to a high power active state when the output from the magnetometer indicate that the device is removed from the protective shipping packaging; and
   a receiver and a transmitter configured to wirelessly communicate with a host device in response to the device being removed from the protective shipping packaging and transitioning to the high power active state.

2. The device of claim 1, wherein the magnetometer is configured to sense proximity to the magnet included in the protective shipping packaging as an indication of whether the device is positioned in or removed from the protective shipping packaging.

3. The device of claim 1, wherein, in response to the device being removed from the protective shipping packaging and transitioning from the low power shipping state to the high power active state, the device is configured to attempt to wirelessly communicate with the host device by engaging in a pairing process with the host device in accordance with a wireless protocol.

4. The device of claim 1, wherein the device comprises a wearable device, a stylus, a mouse, a controller, or a keyboard.

5. A device, comprising:
   a battery;
   an acceleration sensor configured to sense an acceleration event of the device;
   a magnetic sensor configured to sense proximity to a magnet attached to a shipping package when the device is positioned in the shipping package; and
   power management circuitry configured to implement a relatively low power shipping state in which the use of the battery is relatively low when the magnetic sensor senses proximity of the magnet and to implement a relatively high power active state in which the use of the battery is relatively high when the magnetic sensor does not sense proximity to the magnet, wherein, when in the relatively low power shipping state, the power management circuitry is configured to receive a signal associated with the acceleration event of the device from the acceleration sensor, and responsive to receiving the signal from the acceleration sensor, the power management circuitry is responsively configured to poll the magnetic sensor to determine whether the device is still proximate to the magnet.

6. The device of claim 5, wherein the power management circuitry is further configured to cause a user-perceptible signal to be generated by the device when implementing the relatively low power shipping state responsive to sensing proximity to the magnet.

7. The device of claim 6, further comprising a light and wherein the power management circuitry is further configured to generate the user-perceptible signal by sequentially activating and deactivating the light.

8. The device of claim 5, wherein the power management circuitry is further configured to cause the device to enter a wireless protocol compliant advertising mode in response to the magnetic sensor not sensing proximity to the magnet.

9. The device of claim 5, wherein the magnetic sensor comprises a hall effect sensor.

10. The device of claim 5, wherein the magnetic sensor comprises a magnetoresistive sensor.

11. The device of claim 5, wherein the acceleration event is calibrated to be similar to a human picking up the device.

12. The device of claim 5, comprising a stylus, a mouse, a keyboard, a wearable, or a game controller.

13. The device of claim 5, wherein the power management circuitry is implemented as a processor, an ASIC, or an FPGA.

14. The device of claim 5, wherein the device is configured as a host wireless device or a peripheral wireless device.

15. A method, comprising:
maintaining a peripheral device in a lower power shipping state in response to detecting that the peripheral device is positioned in a protective shipping package;
detecting an acceleration event of the peripheral device;
sensing whether the peripheral device is proximate to a magnet attached to the protective shipping package in response to detecting the acceleration even;
transitioning the peripheral device into a higher power active state in response to sensing that the peripheral device is removed from the protective shipping package; and
communicating wirelessly with a host device in response to the peripheral device being transitioned from the lower power shipping state to the higher power active state.

16. The method of claim 15, wherein communicating wirelessly comprises pairing with the host device in accordance with a wireless protocol.

17. The device of claim 3, wherein the transmitter is configured to send an identification of the device to the host device during the pairing process.

18. The device of claim 8, further comprising:
a wireless transceiver configured to send an identification of the device to a host device while the device is in the wireless protocol compliant advertising mode.

19. The method of claim 16, wherein the pairing comprises wirelessly sending an identification of the peripheral device to the host device.

20. The method of claim 15, wherein the acceleration event corresponds to a person picking up the peripheral device.

* * * * *